United States Patent [19]

Harlan, Jr.

[11] 4,007,311
[45] Feb. 8, 1977

[54] POLYACRYLATE-GRAFTED BLOCK COPOLYMER ADHESIVE COMPOSITIONS

[75] Inventor: James T. Harlan, Jr., Houston, Tex.

[73] Assignee: Shell Oil Company, Houston, Tex.

[22] Filed: Nov. 6, 1975

[21] Appl. No.: 629,455

[52] U.S. Cl. .......................... 428/246; 260/859 R; 260/876 B; 260/880 B; 428/251; 428/285; 428/286; 428/442; 428/457; 428/462; 428/463; 428/521; 428/522

[51] Int. Cl.² .................. C08L 27/00; C08L 75/00

[58] Field of Search ....... 260/859 R, 876 B, 880 B; 428/246, 251, 285, 286, 442, 457, 462, 463, 521, 522

[56] References Cited
UNITED STATES PATENTS

| | | |
|---|---|---|
| 3,595,942 | 7/1971 | Wald et al. .................... 260/880 B |
| 3,784,587 | 1/1974 | Chambers ...................... 260/880 B |
| 3,824,149 | 7/1974 | Harlan et al. .................. 260/880 B |
| 3,846,511 | 11/1974 | Hill ................................ 260/880 B |
| 3,850,858 | 11/1974 | Park .............................. 260/880 B |
| 3,904,801 | 9/1975 | Harlan ........................... 260/880 B |
| 3,917,607 | 11/1975 | Crossland ...................... 260/880 B |
| 3,919,035 | 11/1975 | Warrach ........................ 260/880 B |

*Primary Examiner*—James J. Bell
*Attorney, Agent, or Firm*—Dean F. Vance

[57] ABSTRACT

The adhesion of hydrocarbon block copolymers to polar substrates is enhanced by compositions containing either blends of polymers of acrylic acid esters with block copolymers or block copolymers modified by grafted polymerized acrylic acid esters.

8 Claims, No Drawings

POLYACRYLATE-GRAFTED BLOCK COPOLYMER ADHESIVE COMPOSITIONS

BACKGROUND OF THE INVENTION

The synthesis and utility of a wide range of block copolymers have advanced rapidly in the past few years. Due to the hydrocarbon structure of many of these block polymers, their utility has been limited in certain applications apparently because of relatively poor adhesion of the block polymers toward polar surfaces such as metal, wood, leather, polyvinyl chloride and polyurethanes. These deficiencies may become apparent, for example, in the construction of shoes and in the manufacture of multiply films. In shoe manufacture, the soling material may be adhered to the upper which may comprise fabric, leather (natural or synthetic) or polyvinylchloride. Well-known adhesives such as the polyurethanes do not provide fully satisfactory results with shoe components comprising entirely hydrocarbon block copolymers. The same is true with polychloroprene adhesives.

OBJECTS OF THE INVENTION

It is an object of the invention to provide compositions of block polymers showing improved adhesion characteristics. It is a further object of the invention to provide improved compositions comprising certain block polymer derivatives with supplementary polymers. It is a further object of the invention to provide assemblies comprising a block polymer substrate and a polar substrate with an intervening modified block polymer adherant. Other objects will become apparent during the following detailed description of the invention.

Now, in accordance with the present invention, a novel adhesive composition is provided which comprises physical blends of polymerized esters of the acrylic acid series and block copolymers containing both polymer blocks of monoalkenylarenes and polymer blocks of conjugated dienes, as well as hydrogenated derivatives of such block copolymers. A further aspect of the present invention comprises compositions of the above types of block copolymers modified by the grafting thereon of polymerized esters of the acrylic acid series, these grafted copolymers being employed in conjunction with at least a second polymer of the group consisting of polyurethanes, polychloroprenes, polystyrenes or hydrocarbon block copolymers and mixtures thereof as more fully defined hereinafter. It is preferred that the polymerized acrylic acid ester or the block polymer, modified with grafts of such polymerized esters, comprise from 5–50% by weight of the composition and that the secondary polymers blended therewith comprise from 95–50% by weight of the composition.

Again in accordance with the present invention, laminates are provided comprising a first substrate of a hydrocarbon polymer, as defined below, a second substrate comprising a textile, polyvinyl chloride, leather, metal or glass and as a bond between the two substrates, a composition comprising the adhesive composition described above.

The unmodified block copolymers are either linear or branched in structure and have at least two terminal polymer blocks of a monoalkenylarene such as styrene or alphamethylstyrene and at least one polymer block of a conjugated diene such as butadiene or isoprene, as well as hydrogenated derivatives of the same. For the purposes of the present invention, the structural configuration is not believed to be of prime importance. The block molecular weights, expressed as number average molecular weights, are determined by infra-red or tritium counting methods. The alkenyl arene polymer blocks normally have average molecular weights between about 4,000 and 50,000, preferably between 14,000 and 25,000. The conjugated diene polymer blocks or their substantially completely hydrogenated counterparts have average molecular weights between about 30,000 and 200,000, preferably between 40,000 and 125,000. Two typical species are as follows:

polystyrene-polybutadiene-polystyrene and
polystyrene-polyisoprene-polystyrene.

In addition to these non-hydrogenated species, certain hydrogenated species thereof may be employed. These comprise polymers in which at least the conjugated diene polymer blocks or any desired fraction thereof are hydrogenated. Selective hydrogenation may be carried out to reduce the olefinic double bonds as described in U.S. Pat. No. 3,595,942.

In one aspect of the present invention, block copolymers such as those described above are physically blended with polymers of esters of the acrylic acid series, including both acrylates and methacrylates. The esters particularly contemplated are those derived from monohydricaliphatic alcohols having 1 to 8 carbon atoms. Mixtures of these esters also are contemplated. Typical esters include methylacrylate, ethylacrylate, butylacrylate, and the corresponding esters of methacrylic acid. The preferred species is methylmethacrylate. The polymers of these monomers are known and consequently do not need to be described further here. The average molecular weight of the products which are especially useful in the present invention lie between about 25,000 and 250,000 or preferably between about 50,000 and 150,000. These polymeric esters may then be physically blended with the block copolymers described above or alternatively may be chemically grafted on to the block copolymer chains by solution polymerization in the presence of the block polymer. This is done by dispersing the block polymer in hydrocarbon solution and grafting the polymerized esters onto the block polymer chains in the presence of a free radical catalyst such as an organic peroxide. It is preferred that the polymethylmethacrylate grafts have average molecular weights within the range recited above for the homopolymers.

Either of these compositions, namely, the physical blend or the grafted block polymer product, may be modified still further with other polymers such as polyurethane, polychloroprene, polystyrene or further proportions of unaltered hydrocarbon block polymers or their hydrogenated counterparts. For example, compositions are contemplated comprising 5–50% by weight of a polymer of the acrylic ester and 95–50% by weight of the above described hydrocarbon block copolymers either as physical blends or as grafts. This composition in turn may be extended by the presence of a polyurethane; for example, the latter being present in an amount of about 1–10 parts by weight for each part by weight of the polyacrylate ester, the block copolymer, or the block copolymer grafted with such ester.

The invention especially contemplates the modification of polyurethane cements (adhesives) such as are widely used in the footwear industry by either the physical blend or the grafted block copolymer as described above. While the adhesion promoter namely the polyurethane blends or grafts may be applied to the surfaces separately from the second polymer such as polyurethane, this extra priming step adds to the cost of manufacturing the assembly. Consequently, the combination of either the physical blend or the grafted product with the second type of polymer such as polyurethane, eliminates the priming step and consequently reduces the cost of manufacture while at the same time enhances the bond between a hydrocarbon block copolymer substrate and one of the polar substrates listed above.

The polyurethanes contemplated as the preferred bonding agent are reaction products of diisocyanates with polyesters, such as shown in the book "Polyurethanes" by Dombrow, and in U.S. Pat. No. 3,433,771. Suitable diisocyanates are the following:
diphenylmethane-4,4'-diisocyanate,
diphenylene-4,4'-diisocyanate,
2,4-toluylene diisocyanate,
2,6-toluylene diisocyanate,
3,3-dimethoxy-4,4'-diphenylene diisocyanate (dianisidine diisocyanate),
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate,
p-phenylene diisocyanate,
1,5-naphthalene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
furfurylidene diisocyanate,
bis-(2-isocyanatoethyl)fumarate.

Suitable polyurethane cements used in the shoe industry include USM 312 or USM 322, both sold by the United Shoe Machinery Company as well as Compo 4500 and Compo 9500, both sold by Compo Industries Incorporated. The following examples illustrate the proportion of the grafted copolymers and the improvement in adhesion of the polyacrylate blends and of the grafted products.

EXAMPLE I

Preparation of Grafted Products

The block copolymer employed had the structure polystyrene-polybutadiene-polystyrene. The block molecular weights being 14,000-65,000-14,000. The block polymer was dissolved in toluene to form a 10% solution which was modified with methylmethacrylate (MMA) to which was then added Benzoyl peroxide (BPO). The amounts of these components are given in the table below as well as the time and temperature of reaction at the end of the reaction period. Hydroquinone was added and the reaction mixture was cooled to terminate the reaction.

| Product Designation | Reactor Charge, Wt. Parts S-B-S | MMA | BPO | Reaction Temp., °C | Time, Hr. | Estimated MMA Conversion, % | PMMA in Product, %w |
|---|---|---|---|---|---|---|---|
| LO-439 | 0 | 100 | 10 | 60 | 2.3 | 30 | 100 |
| LO-444 | 100 | 50 | 10 | 70 | 1.2 | 21 | 9 |
| LO-445 | 100 | 100 | 10 | 70 | 2.2 | 32 | 24 |
| LO-446 | 100 | 150 | 10 | 70 | 2.0 | 44 | 40 |

EXAMPLE II

Physical blends of polymethylmethacrylate and the block copolymer described in example 1 were tested as bonding compositions between hydrocarbon block polymer substrates and leather. For this purpose, compositions comprising 20 parts by weight of polymethylmethacrylate (100,000 av.mol.wt.) were blended with 100 parts by weight of block copolymer were dispersed in toluene/methyl ethyl ketone solution. The solution was applied as a primer to suede and block copolymer surfaces and solvent was then evaporated. A commercial polyurethane cement was then applied to each of the primed surfaces and solvent was allowed to evaporate. The two coated surfaces were heated and bonded together (while hot) by pressing. Peel strengths were measured in an Instron Tester at a separation rate of 2 inches per minute. The peel strength was 43–48 lb/in. Without the methacrylate in the primer, peel strengths were only about 6–9 lb/in.

EXAMPLE III

A grafted copolymer comprising polystyrene-polybutadiene-polystyrene grafted with polymethylmethacrylate as described in example 1 and containing 74% by weight of grafted methacrylate was mixed with a polyurethane adhesive sold commercially as USM-322 in an amount of 10% of the grafted product and 90% of cement solids. This blend was found to be a completely satisfactory bonding agent to join a polyvinyl chloride substrate with a hydrocarbon block polymer substrate.

What is claimed is:
1. An adhesive composition comprising:
   a. 5 to 50% by weight of a graft copolymer of a block copolymer and a polymerized alkyl ester of an acid of the acrylic acid series wherein said block copolymer is selected from the group consisting of monoalkenyl arene-conjugated diene block copolymers and selectively hydrogenated monoalkenylarene-conjugated diene block copolymers; and
   b. 95% to 50% by weight of a polyurethane cement.
2. A laminate comprising:
   a. a first substrate comprising a block copolymer having at least one polymer block of the group consisting of polymer blocks of conjugated dienes and hydrogenated polymer blocks of conjugated dienes, and at least two polymer blocks of a monoalkenylarene;
   b. a second substrate of the group consisting of a textile, polyvinyl chloride, leather, metal and glass;
   c. and as a bond therebetween a composition according to claim 1.

3. A composition according to claim 1 wherein said block copolymer has the structure styrene-butadiene-styrene.

4. A composition according to claim 1 wherein said block copolymer has the structure styrene-isoprene-styrene.

5. A composition according to claim 3 wherein the polymerized alkyl ester is poly(methylmethacrylate).

6. A composition according to claim 1 wherein said block copolymer has grafted thereon poly(methylmethacrylate) in an amount of 5–50% by weight of the copolymer grafted product.

7. A composition according to claim 2 wherein said second substrate is polyvinyl chloride.

8. A composition according to claim 7 wherein said first substrate is a styrene-butadiene-styrene block copolymer composition.

* * * * *